United States Patent
Crespi

(10) Patent No.: US 6,416,022 B1
(45) Date of Patent: Jul. 9, 2002

(54) ARRANGEMENT OF CABLE-HOLDER CHAIN, IN PARTICULAR FOR TELESCOPIC UNITS

(75) Inventor: Gilberto Crespi, Magnago (IT)

(73) Assignee: Kabelschlepp Italia S.r.l., Milan (IT)

( * ) Notice: Subject to any disclaimer, the term of this patent is extended or adjusted under 35 U.S.C. 154(b) by 0 days.

(21) Appl. No.: 09/616,740

(22) Filed: Jul. 14, 2000

(30) Foreign Application Priority Data

Jul. 20, 1999 (IT) .......................................... MI990466 U

(51) Int. Cl.⁷ .............................................. F16G 13/16
(52) U.S. Cl. ......................................... 248/49; 59/78.1
(58) Field of Search ........................... 248/279.1, 286.1, 248/298.1, 693, 49, 51, 60; 403/109.1, 109.6, 109.7, 109.8, 377, 379.1, 379.6; 59/78.1; 14/71.5

(56) References Cited

U.S. PATENT DOCUMENTS

| | | | |
|---|---|---|---|
| 707,151 A | * 8/1902 | Moss | ........................ 248/480 |
| 3,717,319 A | * 2/1973 | Schultz et al. | ................ 248/49 |
| 3,779,003 A | * 12/1973 | Boissevain et al. | .......... 59/78.1 |
| 3,792,189 A | * 2/1974 | Stengel et al. | ................ 174/69 |
| 4,373,324 A | * 2/1983 | Janos | ........................ 59/78.1 |
| 4,526,090 A | * 7/1985 | Maier | ........................ 98/33.1 |
| 4,715,077 A | * 12/1987 | Shepheard | ................... 14/71.5 |
| 5,649,415 A | * 7/1997 | Pea | ............................. 59/78.1 |
| 5,877,936 A | * 3/1999 | Nishitani et al. | ........... 361/600 |

FOREIGN PATENT DOCUMENTS

| | | | | |
|---|---|---|---|---|
| GB | 2132973 A1 | * 7/1984 | ................... | 248/49 |
| JP | 2-225892 B1 | * 9/1990 | ................... | 248/49 |

* cited by examiner

*Primary Examiner*—Leslie A. Braun
*Assistant Examiner*—Jon Szumny
(74) *Attorney, Agent, or Firm*—Hedman & Costigan, P.C.

(57) ABSTRACT

An arrangement of cable-holder chain, in particular for telescopic units, combinable with a telescopic unit (12) for containing and guiding flexible pipelines and the like, wherein it is provided that the cable-holder chain (11) has a fixed point (13), integral with a fixed element (14) of the telescopic unit (12) and a mobile point (16) integral with a mobile element (15, 19) of the telescopic unit (12), wherein the cable-holder chain (11) is fastened to the fixed point (13) so as to extend backwards to the fixed element (14) and bend forward to the mobile point (16) of the mobile element (15, 19).

4 Claims, 2 Drawing Sheets

ARRANGEMENT OF CABLE-HOLDER CHAIN, IN PARTICULAR FOR TELESCOPIC UNITS

The present invention relates to an arrangement of a cable-holder chain, in particular for telescopic units. It must be considered that the generic expression "cable-holder", which shall be used hereafter, refers to both a cable-holder chain and to open and/or closed or an openable cable-holder chain, made of steel, polyamide, nylon and more in general, of other plastic or ferrous materials, adapted to contain and guide generic flexible pipelines or energy carriers (water, electric current, transmission cables, gas, oil etc.)

A cable-holder can be critical in its behavior when it undergoes stresses of flexure, in particular when they are used for carrying the above generic pipelines to aerial positions. In fact, a cable-holder in this position has a deployment that determines the possibility of flexion; thus, they must be manufactured with particular self-supporting devices adapted to guarantee their use without any danger of breaking.

For example, applications for a cable-holder like those shown in FIG. 6 are known, wherein a cable-holder P has a fixed point A, integral with a lower portion of a first fixed telescopic element C provided with a fixed raceway E, and a mobile point B, integral with a upper end of a second telescopic element D, extractable or extendable from a fixed element C and shown in FIG. 6 already extracted.

A cable-holder P, being integral with an extractable element C in point B, extends with a mobile element C, that is to say, towards the upper point, and being fastened to a upper mobile point, it realizes a bend directed backwards and downwards.

It is immediately evident that, in the extracted and extended position of the figure, a cable-holder P, in its portion that remains suspended, bends, as it does not have any support in point R, with danger of breaking, and during its back-movement, it tends to get stuck in point A, which causes both bad operation and wear and possible breaking.

An object of the present invention is that of providing as arrangement of a cable-holder chain, in particular for telescopic units, adapted to contain and guide flexible pipelines and/or energy conductors, which should overcome the disadvantages exposed above, without having a particularly complex structure.

Therefore, another object is that of providing an arrangement of a cable-holder chain, which should not be subjected to stresses and dangers of breaking.

Another object of the present invention is that of providing an arrangement of a cable-holder chain, in particular for telescopic units, which should be particularly simple and easy to manufacture and to carry out.

These objects according to the present invention are attained realizing an arrangement of a cable-holder chain, in particular for telescopic units, as presented herein.

Further constructive features are shown in the attached dependent claims.

Further features and advantages of an arrangement of a cable-holder chain, in particular for telescopic units, according to the present invention, will appear more clearly from the following exemplifying and non-limiting detailed description, made with reference to the attached drawings. In such drawings.

Figure 1:
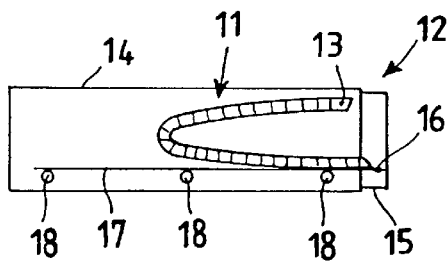
FIG. 1 shows a schematic side elevation view, of a first example of an embodiment of an arrangement of a cable-holder chain, in particular for telescopic units, according to the present invention, in retracted position.

With reference to FIGS. 1–5, there is shown in general an arrangement of a cable-holder chain, in particular for telescopic units, wherein a cable-holder chain 11 is combinable with a telescopic unit 12, such as an aerial basket, an operating liftable device, etc., for containing and guiding flexible pipelines or the like, servo and power controls.

A cable-holder chain 11 has one end connected to a fixed point 13 of a fixed element 14, provided in an upper portion in height in said fixed element 14, within the end facing a mobile element 15 being part of the telescopic unit 12. In fact, said fixed element 14, together with the said mobile element 15, builds up said telescopic unit 12.

The other end of a cable-holder chain 11 is fastened to a mobile point 16 integral with the low portion in height of said mobile element 15 in its end portion facing outwards.

Figure 2:
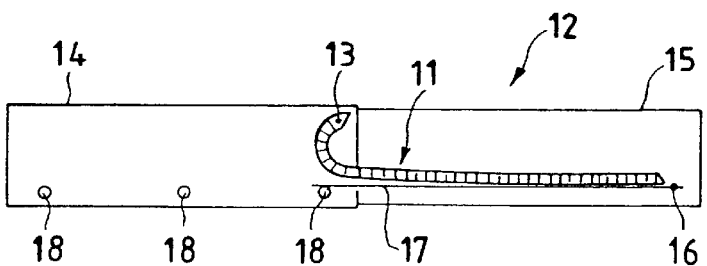
FIG. 2 shows a side elevation view of the chain of FIG. 1 in extracted position.

FIGS. 1 and 2 shows a first example of an embodiment wherein the two elements are in two retracted and extracted positions. It can be noted that a cable-holder chain, when said mobile element 15 is completely retracted into the fixed element 14, is arranged according to a U-configuration, resting on a side of said U with the open upper portion facing the direction of reciprocal deployment between said two mobile 15 and fixed 14 elements of the above-mentioned telescopic unit 12, respectively.

The lower portion of chain 11, when bent in a U shape, rests on a raceway 17 integral with a mobile element 15, which functions as a mobile support element. In turn, raceway 17 rests on another support element, in the example made up of three rollers 18, integral with a fixed element 14, or any other suitable fixed support.

According to the present invention, a cable-holder chain 11 is fastened to a fixed point 13 so as to extend backwards towards a fixed element 14, and bend forward to a mobile point 16 of said mobile element 15.

In this way it can be noted that, in the retracted position, a cable-holder chain 11 is bent backwards in an opposed direction with respect to that of deployment, and rests on a raceway or a support element 17. When the deployment occurs, that is, when telescopic unit 12 is extended in elongation, said chain is brought to increasingly lay onto raceway 17, without any frictioned sliding, so that it is carried easily and without any problems.

Moreover, it can be noted that the length of a cable-holder chain 11 is fully used.

Figure 3:
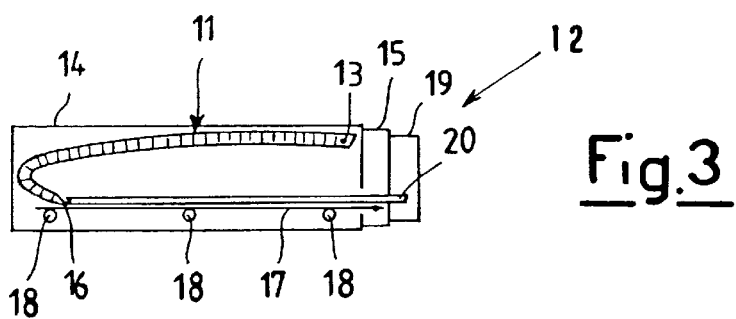
FIG. 3 shows a schematic side elevation view of a second example of an embodiment of an arrangement of a cable-holder chain, in particular for telescopic units, according to the present invention, in retracted position.
Figure 4:
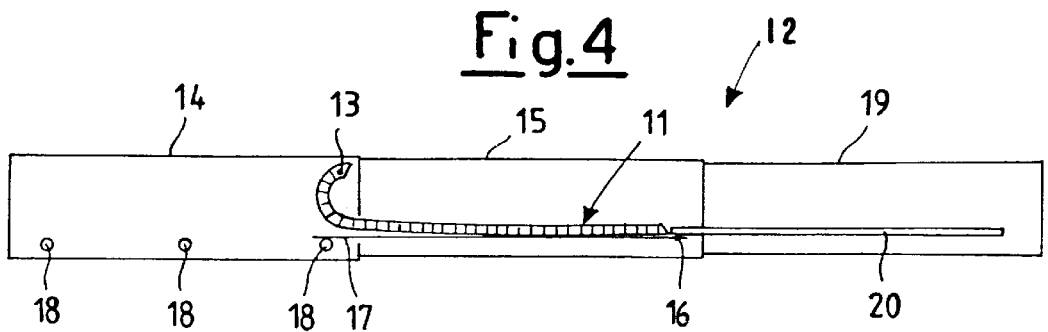
FIG. 4 shows a side elevation view of the chain of FIG. 3 in extracted position.
Figure 5:
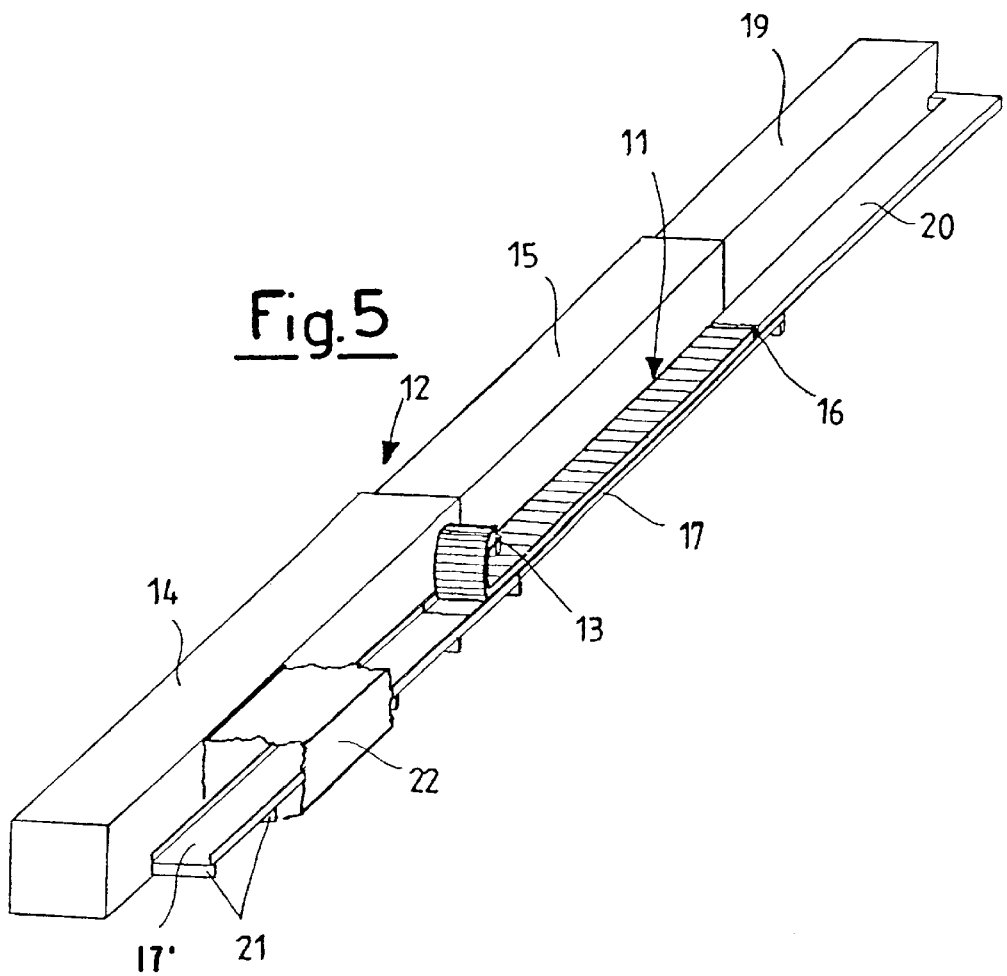
FIG. 5 shows a perspective view of the realization of FIG. 4.
Figure 6:
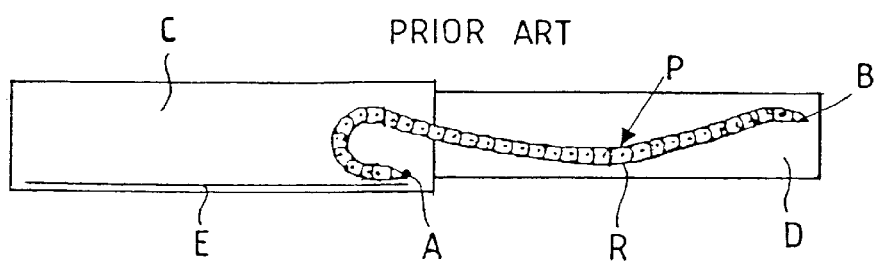
FIG. 6 shows a side elevation view of a known cable-holder chain in extracted position.

FIGS. 3, 4 and 5 show a second embodiment of the arrangement of a cable-holder chain wherein like elements are indicated with the same reference numerals as the previous FIGS. 1 and 2.

In particular, the telescopic unit also comprises third mobile element 19 and a rigid extension 20 of a cable-holder chain 11. The rigid extension is connected on one side to a telescopic element 19, and on the other side, to a cable-holder chain 11 at a mobile point 16.

FIG. 5 shows that a cable-holder chain according the present invention is carried by a pair of raceways 17 and 17', of which one is fixed and the other is mobile. In this case, raceway 17' replaces the rollers 18, and is fixedly carried on support brackets 21. It can be noted that the chain advantageously has the same length, also in this three-members example of the telescopic unit 12. In fact, the excess portion needed for the extension in maximum extension of the telescopic unit is compensated by the rigid extension 20. Of course, in maximum retracted condition, the mobile point 16 of chain 11 will not move to about half the support raceway 17, but it will extend up to the opposed end, the most inner one, as also the rigid extension 20 must move inwards, too.

In general, in both examples both the mobile parts and the fixed support parts of the chain, and the chain itself, are covered with a freely removable enclosing case 22.

Thus, it is possible to use small chains with respect to those generally used, since they are supported in any position of their operation. The need of having a chain provided with self-supporting devices, as well as useless frictioned sliding, are thus prevented.

The absence of harmful frictioned sliding or of stresses on the chain is realized both in even and uneven deployment conditions.

In all the illustrated cases, a better distribution of the forces involved on a cable-holder chain is obtained, thus preventing stresses that sometimes a disadvantageous, and can make the chain break.

The arrangement of a cable-holder chain according to the present invention is particularly useful and simple thanks to its location and to the collaborating arrangement of its constituting parts.

What is claimed is:

1. An arrangement of a cable-holder chain, in combination with a telescopic unit (12) for containing and guiding flexible pipelines, wherein it is provided that said cable-holder chain (11) has a fixed point (13) arranged in an upper portion of said telescopic unit (12), integral with a fixed element (14) of said telescopic unit (12) and mobile point (16) arranged in a lower portion of said telescopic unit (12), integral with a mobile element (15, 19) of said telescopic unit (12), and said telescopic unit (12) comprises a third mobile element (19) integrally connected to rigid extension (20) of said cable-holder chain (11) connected to the free end of said mobile point (16), characterize in that said cable-holder chain (11) is fastened to said fixed point (13) so as to extend backwards to said fixed element (14) and bend forward to said mobile point (16) of said mobile element (15, 19).

2. An arrangement of a cable-holder chain, in combination with a telescopic unit (12) for containing and guiding flexible pipelines, wherein it is provided that said cable-holder chain (11) has a fixed point (13) arranged in an upper portion of said telescopic unit (12), integral with a fixed element (14) of said telescopic unit (12) and a mobile point (16) arranged in a lower portion of said telescopic unit (12), integral with a mobile element (15, 19) of said telescopic unit (12), and said telescopic unit (12) comprises a third mobile element (19) integrally connected to a rigid extension (20) of said cable-holder chain (11) connected to the free end of said mobile point (16), characterized in that said cable-holder chain (11) is fastened to said fixed point (13) so as to extend backwards to said fixed element (14) and bend forward to said mobile point (16) of said mobile element (15, 19), characterized in that said cable-holder chain (11), when said third mobile element (19) is completely retracted into said fixed element (14), is arranged with said mobile point (16) thereof at the opposed end with respect to the direction of reciprocal deployment between said mobile (15, 19) and fixed (14) elements of said telescopic unit (12).

3. An arrangement of a cable-holder chain, in combination with a telescopic unit (12) for containing and guiding flexible pipelines, wherein it is provided that said cable-holder chain (11) has a fixed point (13) arranged in an upper portion of said telescopic unit (12), integral with a fixed element (14) of said telescopic unit (12) and a mobile point (16) arranged in a lower portion of said telescopic unit (12), integral with a mobile element (15, 19) of said telescopic unit (12), and said telescopic unit (12) comprises a third mobile element (19) integrally connected to a rigid extension (20) of said cable-holder chain (11) connected to the free end of said mobile point (16), characterized in that said cable-holder chain (11) is fastened to said fixed point (13) so as to extend backwards to said fixed element (14) and bend forward to said mobile point (16) of said mobile element (15, 19), characterized in that integral with and in a lower portion of said fixed element (14) there are support elements (18) and said fixed support elements are rollers, a further support element (17) is movable and integral with said mobile element (15) and said mobile support element is a raceway.

4. An arrangement of a cable-holder chain, in combination-with a telescopic unit (12) for containing and guiding flexible pipelines, wherein it is provided that said cable-holder chain (11) has a fixed point (13) arranged in an upper portion of said telescopic unit (12), integral with a fixed element (14) of said telescopic unit (12) and a mobile point (16) arranged in a lower portion of said telescopic unit (12), integral with a mobile element (15, 19) of said telescopic unit (12), and said telescopic unit (12) comprises a third mobile element (19) integrally connected to a rigid extension (20) of said cable-holder chain (11) connected to the free end of said mobile point (16), characterized in that said cable-holder chain (11) is fastened to said fixed point (13) so as to extend backwards to said fixed element (14) and bend forward to said mobile point (16) of said mobile element (15, 19), characterized in that integral with and in a lower portion of said fixed element (14) there are support elements (18) and said fixed support elements are rollers, a further support element (17) is movable and integral with said mobile element (15) and said mobile support element is a raceway, characterized in that said chain (11) and said support elements (17, 18) are covered with a freely removable enclosing case (22).

* * * * *